Andrew Q. Smith
Andrew Q. Smith, Jr.
INVENTORS

March 5, 1957     A. Q. SMITH ET AL     2,783,603
ROW CROPPER ATTACHMENT FOR COMBINES Filed Jan. 18, 1954     2 Sheets-Sheet 2

Andrew Q. Smith
Andrew Q. Smith, Jr.
INVENTORS

United States Patent Office 2,783,603
Patented Mar. 5, 1957

2,783,603

ROW CROPPER ATTACHMENT FOR COMBINES

Andrew Q. Smith and Andrew Q. Smith, Jr.,
Portales, N. Mex.

Application January 18, 1954, Serial No. 404,638

1 Claim. (Cl. 56—119)

This invention relates to a row cropper attachment and more particularly to a device which is adapted to be secured to the forward end of a combine for harvesting plants which are disposed in rows.

An object of this invention is to provide an attachment whereby a conventional combine can be converted for harvesting rows of plants.

A further object of this invention is to provide a row cropper attachment for combines having means for directing the plants of the row against rotating cutter blades.

A still further object of this invention is to provide a row cropper attachment for combines having means for directing the cut plants to the conveyor of the combine.

A still further object of this invention is to provide a row cropper attachment for combines having novel means for driving the cutters and the means for directing the plants against the cutters.

A yet further object of this invention is to provide a row cropper attachment for combines which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
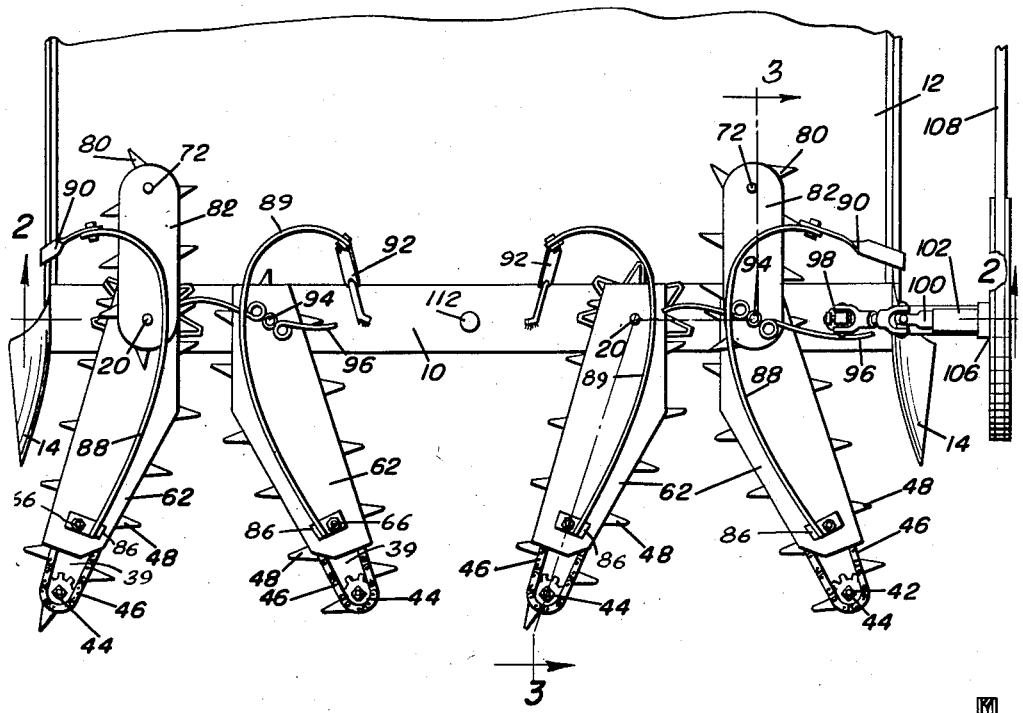
Figure 1 is a top plan view showing the improved row cropper attachment forming the subject of this invention mounted on the forward end of a combine.
Figure 2 is a sectional view taken substantially along the section line 2—2 of Figure 1.
Figure 3:
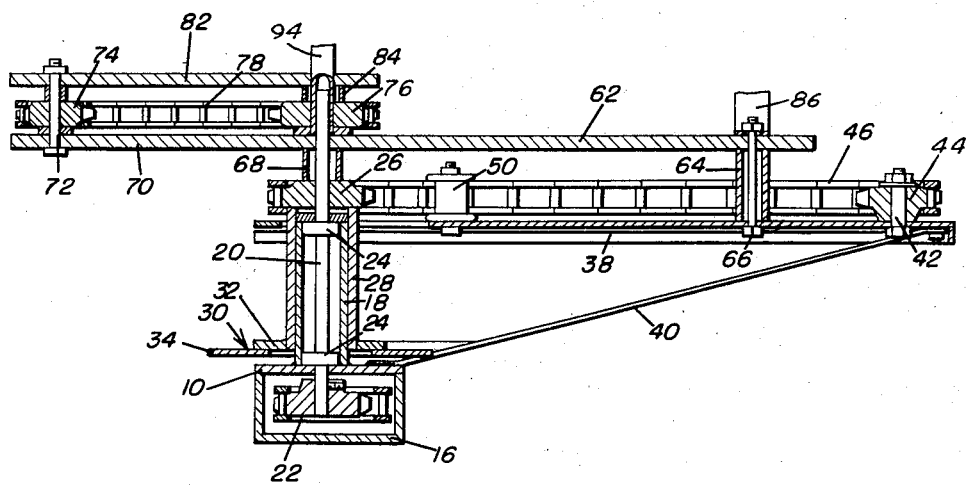
Figure 3 is an enlarged sectional view taken substantially along the section line 3—3 of Figure 1 and with parts in elevation and with parts broken away.
Figure 4:
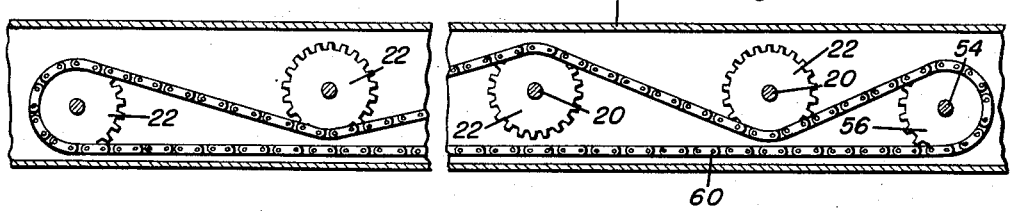
Figure 4 is an enlarged sectional view taken substantially along the section line 4—4 of Figure 2.
Figure 5:
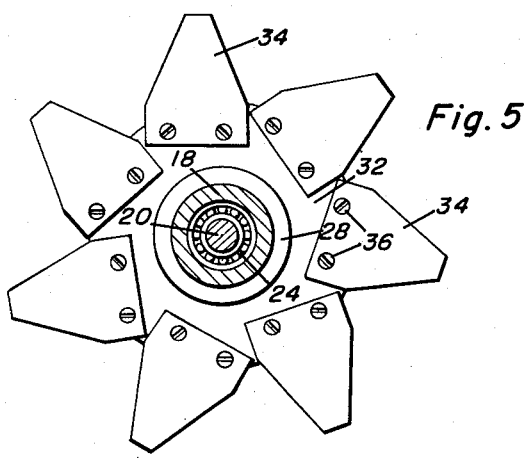
Figure 5 is an enlarged detail view partly in longitudinal section and partly in plan of one of the rotating cutter blades used in conjunction with the attachment.

Referring now more specifically to the accompanying drawings, it will be seen that the improved row cropper attachment forming the subject of this invention includes a base plate 10 which is adapted to be secured to the forward end of a combine 12. The combine 12 is provided with upstanding side walls 14. The base plate 10 is mounted as a cover on a longitudinally extending pan-shaped member 16. The purpose of the pan-shaped member 16 will be later described.

The base plate 10 is provided with a plurality of sleeves 18 secured to the upper surface thereof. The sleeves 18 are disposed in spaced pairs along the base plate 10. Disposed within each of the sleeves 18 is a shaft 20, which shaft is rotatably mounted in the base plate 10. The lower end of each shaft 20 extends below the plate 10 within the member 16. The upper end of each shaft 20 extends above the upper end of the sleeve 18. Fixedly secured to the lower end of each shaft 20 is a drive gear 22 or sprocket. Disposed within each sleeve 18 are upper and lower bearing units 24 which support the shaft 20 for rotation therein. The bearing units 24 can be of any conventional construction.

Secured to each shaft 20 adjacent the upper end thereof is a sprocket 26. One sprocket of each pair of shafts is provided with a downwardly extending sleeve 28 secured thereto, which sleeve surrounds the sleeve 18. A cutter blade 30 is secured to the lower end of each sleeve 28 and extends radially therefrom. The cutter blades 30 are formed of central circular plates 32 rigidly secured to the lower ends of the sleeves 28 and a plurality of radially extending blades 34 secured to the outer periphery of plates 32 by means of fasteners 36.

A longitudinally extending frame member 38 is mounted in any suitable manner, not shown, on the base 10 and extends forwardly therefrom adjacent each of the shafts 20. The frame 38 is horizontally disposed and is provided with a vertical portion 38' extending downwardly therefrom adjacent the upper surface of the plate 10. The frames 38 form pairs and each provided with a portion 39 diverging outwardly away from the other frame of the associated frame of the pair. Suitable brace means 40 are connected to the base plate 10 and to the outer ends of the frames 38 for supporting the same in horizontal position. Secured to the front end of each of the frames 38 is a vertically extending shaft 42. Rotatably mounted on each shaft 42 is a sprocket 44 which is aligned with the sprocket 26 on the associated shaft 20. A chain conveyor 46 having a plurality of outwardly extending projections 48 is entrained around the sprockets 26 and the sprockets 44. As will be seen, the chain conveyors 46 form pairs. A guide roller 50 is secured to the frame 38. The guide roller 50 causes the chain conveyor 46 to follow the contour of the portion 39 and to diverge correspondingly in the pairs.

One end of the base plate 10 is provided with a sleeve 52 similar to the sleeve 18. Rotatably mounted within the sleeve 52 and the plate 10 is a shaft 54 provided at its lower end in the member 16 with a sprocket 56. A sprocket chain 60 is entrained around the sprockets 56 and 22 in such a manner as to drive the shafts 20 of each pair in opposite directions with respect to each other.

Fixedly secured to each of the longitudinal frame members 38 and spaced thereabove is a guard 62. The guard 62 is supported at one end by a spacer member 64 having a bolt 66 extending therethrough between the frame member 38 and the guard 62. The outer end of the guard 62 is supported by means of a spacer sleeve 68 which surrounds the shaft 20 above the sprocket 26. The shaft 20 extends through the guard 62 and is rotatably journaled therein. One guard member 62 of each pair is provided with a rearwardly extending portion 70. Secured to the rear end of the portion 70 is a shaft 72 extending vertically therefrom. A sprocket 74 is rotatably mounted on each shaft 72. The shaft 20 associated with the rearwardly extending portion 70 is provided with a sprocket 76 secured thereto above the guard 62. A conveyor chain 78 having outwardly extending projections 80 is entrained around the sprockets 74 and 76. A suitable guard plate 82 is disposed above the conveyor chain 78 and is mounted at one end on the shaft 72 and at the other end by means of a spacer 84 surrounding the shaft 20 above the sprocket 76.

Guide means are provided for the tops of the plants to be cut, and these guide means comprise a vertically disposed member 86 secured to the upper surface of each guard 62 adjacent the forward end thereof. Rearwardly extending horizontally disposed pairs of outermost and innermost members 88, 89 are secured to the upper ends of the members 86 and the members 88, 89 of each pair of guard members 62 converge rearwardly.

The outermost members 88 of each pair are provided with extensions 90 which engage the sides 14 of the combine for more rigidly securing the guards in position. The innermost members 89 of each pair are provided with extensions 92 for securing their ends to the base plate 10.

Two of the shafts 20 are provided with an extension 94 extending upwardly therefrom. The extensions 94 support spring fingers 96 which engage the cut plants to force the same against the chain conveyors 78 whereby the chain conveyors 78 can direct the cut plants rearwardly to the combine.

Suitable couplings 98 are connected to the upper end of the shaft 54 and to a shaft 100 rotatably mounted in a bearing 102. The bearing 102 is mounted on a bracket 104 which is adapted to be secured to the side 14 of the combine 12. The other end of the shaft 100 is provided with a pulley 106 which has a belt 108 entrained therearound, which belt is also entrained around a suitable pulley on the combine for imparting rotation to the shaft 100.

In practical use, the attachment is positioned on the forward edge of the combine 12 with the chain conveyors 46 extending forwardly from the combine. The combine is positioned so that each pair of chain conveyors 46 straddles a row of plants. Then the power of the combine is connected to the pulley 106 by means of belt 108. As the pulley 106 rotates, the shafts 100 and 54 will, in turn, be caused to rotate. This will cause the sprocket 56 to drive chain 60 to drive the sprockets 22 and shafts 20. As the shafts 20 are rotated the chain conveyors 46 will be driven in opposite directions so as to cause the opposing flights of the chains to move rearwardly. This will cause the plants to be forced rearwardly against the cutter blades 34. The cutter blades 34 will also be driven by their shafts 20. After the plants have been cut, they will be engaged by the projections 80 on the chain conveyors 78 and forced rearwardly to the conveyor of the combine. The rotation of the shafts 20 will also cause the extensions 94 to rotate and the spring fingers 96 will engage the cut plants to force them against the chain conveyors 78 to ensure the rearward movement of the cut plants.

The base plate 10 may be provided with a filler opening 110 whereby oil or other suitable lubricant may be inserted into the container 16 to lubricate the parts therein. A suitable cap 112 may be provided for the opening 110.

From the foregoing, the construction and operation of the device will be readily understood. However, since numerous modifications and changes will readily occur to those skilled in the art, it is not desired to limit the invention to the exact construction shown and described and accordingly all suitable modifications and equivalents may be resorted to, falling within the scope of the appended claim.

What is claimed as new is as follows:

A row cropper attachment for combines comprising an elongated base plate attachable at its ends to and transversely of the forward end of a combine, a plurality of upright sleeves fixed to said plate and spaced apart longitudinally of said plate, a pair of upright shafts journaled through said sleeves and plate and having upper ends above said sleeves, sprocket and chain connections between said shafts below said plate operative to drive said shafts oppositely relatively, a pair of rigidly mounted elongated frames extending horizontally forward of said forward end across and above said plate and laterally spaced to straddle a row of plants, a pair of horizontal sprocket and chain conveyors above said frames extending along said frames and including idler sprockets on said frames and driving sprockets on the upper ends of said shafts whereby said shafts drive the conveyor chains oppositely relatively for the purpose specified, a third upright sleeve rotatably mounted on one of the first named sleeves and having an upper end fixed to one of said driving sprockets for rotation thereby, and a rotary cutter blade fixed on a lower end of said third sleeve for cutting the plants in the row.

References Cited in the file of this patent

UNITED STATES PATENTS

| | | |
|---|---|---|
| 1,344,017 | Zimpfer | June 22, 1920 |
| 1,390,159 | Price | Sept. 6, 1921 |
| 2,022,339 | Cleavinger | Nov. 26, 1935 |
| 2,089,120 | Harnisch | Aug. 3, 1937 |
| 2,139,962 | Knudson | Dec. 13, 1938 |
| 2,467,790 | Welty | Apr. 19, 1949 |